United States Patent [19]

Otoi

[11] 4,449,091
[45] May 15, 1984

[54] POWER CONTROLLING CIRCUIT FOR AUTOMATIC REGULATING APPARATUS

[75] Inventor: Takashi Otoi, Arita, Japan

[73] Assignee: Hanwa Elecyronic Co., Ltd., Wakayama, Japan

[21] Appl. No.: 336,331

[22] Filed: Dec. 31, 1981

[51] Int. Cl.³ .............................................. G05F 1/45
[52] U.S. Cl. .................................... 323/236; 323/910
[58] Field of Search ............... 323/319, 910, 235, 236, 323/241, 322; 307/296 R, 297

[56] References Cited

U.S. PATENT DOCUMENTS 4,050,008 9/1977 Glaser et al. ..................... 323/319
4,287,468 9/1981 Sherman .......................... 323/319

Primary Examiner—A. D. Pellinen
Attorney, Agent, or Firm—Jackson, Jones & Price

[57] ABSTRACT

A power controlling circuit for automatic temperature regulator or the like using a zero voltage switching control. Clocks are dispersed and selected, in accordance with control factor, from among the clocks synchronized with the load power supply when zero voltage is detected from the load side to perform the zero cross control of the energization to the load through the detection of the zero voltage from the load side thereby to drive the zero cross control by the selection clock. The current limit close to the phase control can be achieved without any production of the noises. Also, the power control can be achieved without any production of the noises and does not damage the resolution and response property.

7 Claims, 13 Drawing Figures (at approximatly 50 %
in control factor)

(at approximately 50 % in
control factor by a trigger
system)

POWER CONTROLLING CIRCUIT FOR AUTOMATIC REGULATING APPARATUS

BACKGROUND OF THE INVENTION

The present invention relates to a power controlling circuit for automatic temperature regulator or the like using a zero voltage switching control.

To control the current flowing to a heater for an automatic temperature regulator or the like to control the temperature, there is known phase control circuitry capable of continuously varying the output current and also so-called zero voltage switching control circuitry for controlling said current by turning on or off a switching element such as thyristor, triac or the like at the point where the AC power supply became zero.

However, in power controlling circuits using phase control, the switch element effects its switching operation. Current flow to the load rapidly rises from zero to a value determined by the load every time the switch element is turned on. As the rising current flow generally includes a frequency component corresponding to the AM radio broadcasting band, serious noise interferes with other electronic appliances to be used in connection with the automatic temperature regulator or the like.

In zero voltage switching proportional controls, problems such as the above-described noise interference or the like is removed. In conventional power controlling circuitry, a circuit for detecting the zero voltage point is provided in the power controlling circuit to operate the switching element such as thyristor, triac or the like to turn the elements ON and OFF at the zero-crossover points. Since the state of the zero-cross circuitry is adapted to continue, the energization and deenergization periods become longer than necessary and the control less accurate than the phase control. Furthermore, the number of the switching elements to be used is increased, the cost of the power controlling circuit is higher, the construction is more complicated, and larger. For example, when the control factor is 50% (the energization and deenergization periods are approximately equal) and the resolution is 0.01 (1/100) in 50 Hz one cycle energization. As a result, the energization and non-energization times become longer than desired and the response speed is deteriorated. Also, the problem is serious when the heat source has a small heat inertia, because the resolution is deteriorated when the response is faster.

SUMMARY OF THE INVENTION

Accordingly, it is a primary object of the present invention to provide a power controlling circuit for automatic temperature regulating apparatus or the like which can eliminate the disadvantages inherent in the conventional apparatus referred to the above.

Another object of the present invention is to provide an automatic temperature regulating apparatus which is adapted to synchronize the output signal to be transmitted in accordance with the condition of the load, with the AC power supply to the load is used to produce a clock as to average the power to be fed to the load thereby to control the zero-cross power controlling circuit in practical use.

According to the present invention, clocks are dispersed and selected, from clocks synchronized with the power source in accordance with control factor. For example, if the instantaneous control factor is 50%, every other clock is selected. Similarly, if the control factor increases to 75%, three out of four clocks are selected. The selected clocks are used to enable the zero-cross control which, in turn, controls the thyristor or the like. Current limiting close to the phase control can be achieved without any production of the noises. This is because the power controlling element can be used within the smaller range of the excessive heat impedance. Also, the power control can be achieved without production of noise and does not damage the resolution and response properties. The temperature control of the heat source having a small heat inertia can be performed with high accuracy. Namely, the present invention provides novel power controlling circuit for automatic temperature regulating apparatus or the like comprising a power supply synchronous clock generating circuit to generate a series of clock pulses any time the voltage of an AC power supply to be fed to load becomes zero, a circuit to receive the feedback signal from the load, a circuit to make a comparison with a particular reference value, and when said feedback signal enters a given control range, to transmit a control signal. Also provided is a circuit to generate serial pulses which are dispersed and selected from a constant number of the clock pulses corresponded to said control range in accordance with the control signal. Circuitry is included so that energization may not continue by two or more periods when the control signal control factor is 50% or less, along with a circuit to detect the zero voltage of the power supply to perform the zero-cross control of the energization of the load, wherein said zero-cross controlling circuit is turned on and off with the serial pulses to allow the energization to be performed to the load only at the ON state. Also, a novel power controlling circuit for automatic temperature regulating apparatus or the like is provided as one preferred embodiment of the present invention, wherein a circuit for switching the selection ratio of the clock to be selected corresponding to the control signal is provided.

These objects and the other objects, features, aspects and advantages of the present invention will become more apparent from the following detailed description of the present invention when taken in conjunction with the accompanying drawings.

DESCRIPTION OF THE PREFERRED EMBODIMENT

Figures 1, 2:
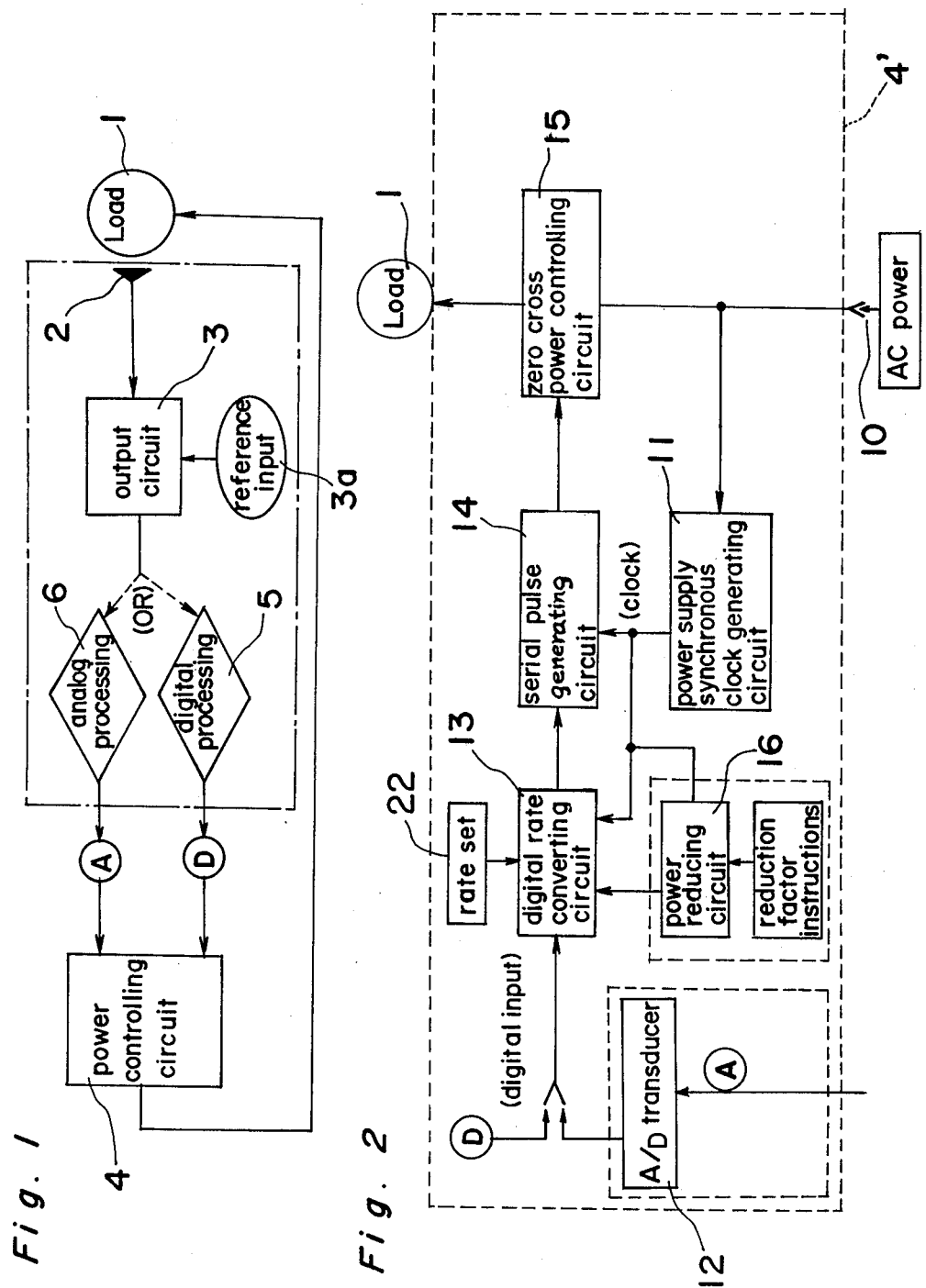
FIG. 1 is a block diagram showing the construction of the entire automatic temperature regulating apparatus in accordance with the present invention.
FIG. 2 is a block diagram of a power control digital circuit as one embodiment of the power controlling circuit of FIG. 1.

Before the description of the present invention proceeds, it is to be noted that like parts are designated by like reference numerals throughout the accompanying drawings.

It is further to be noted that, for the sake of description of the present invention, an automatic temperature regulating apparatus to which the present invention is directed will be described by way of a heater as an embodiment shown in the drawings, it being understood that the concept of the present invention can equally be applicable not only to a thermal device, but also to a heating apparatus and the like.

FIG. 1 shows the entire construction of a heater provided with an automatic temperature regulating apparatus, in which a heater load or the like is designated as 1. A thermal sensor 2 is provided to detect at all times the condition of the load 1 such as the temperature of the heater to output a feedback signal corresponding to the detected value. Thus, the feedback signal is indicative of the amount of power actually applied to the load. Also, there are provided an output circuit 3 as a temperature regulator for the heater, which optionally, automatically regulates the feedback signal of the sensor 2 or compares or calculates it with a preprogrammed reference input 3a to output an analog signal or a digital signal, and a power controlling circuit 4 which controls the power to be supplied to the load in accordance with the output signal of the output circuit 3. The reference signal is, therefore, indicative of the nominal amount of power to be applied to the load. The automatic temperature regulating apparatus comprises in a combination with the power controlling circuit 4 a novel arrangement of the present invention and the other circuit 1, 2, 3, 5, 6 each constructed within the conventional components, respectively. The output circuit 3 is adapted to compare the feedback signal with a particular value of reference input 3a, and when the feedback signal from the load 1 enters a given control range, to transmit the control signal of a control factor in accordance with it. Also, the power controlling circuit 4 is provided with a power supply synchronous clock generating circuit for generating a series of clock pulses each time the voltage of an AC power supply becomes zero, and a selected serial pulse generating circuit for causing a constant number of the clock pulses corresponding to the control range of the output circuit 3 to disperse, on the average, the clocks corresponding to the control signal selected from among the constant number of the clock pulses so that two clocks or more may not continue, when the control factor of the control signal is 50% or less, to generate a selected serial pulse, thereby to transmit the output wave-form close to one cycle energization, which is not continuous as much as possible with the control signal as the serial pulse. A processing circuit 5 or 6 for digital-or analog-processing the feedback signal from the load 1 may be additionally provided on the power controlling circuit 4. The power controlling circuit 4 may be constructed as a digital circuit or an analog circuit in a known manner. First, the power controlling circuit 4 constructed as a digital circuit shown in FIG. 2 through FIG. 4 will be described hereinafter.

Figure 3:
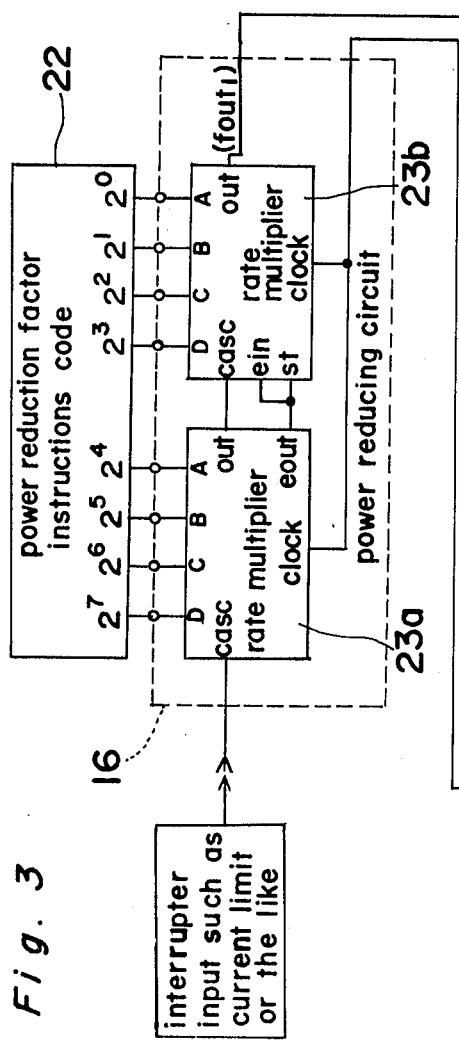
FIG. 3 is a circuit diagram showing details of the circuit construction of the circuit of FIG. 2.
Figure 3:
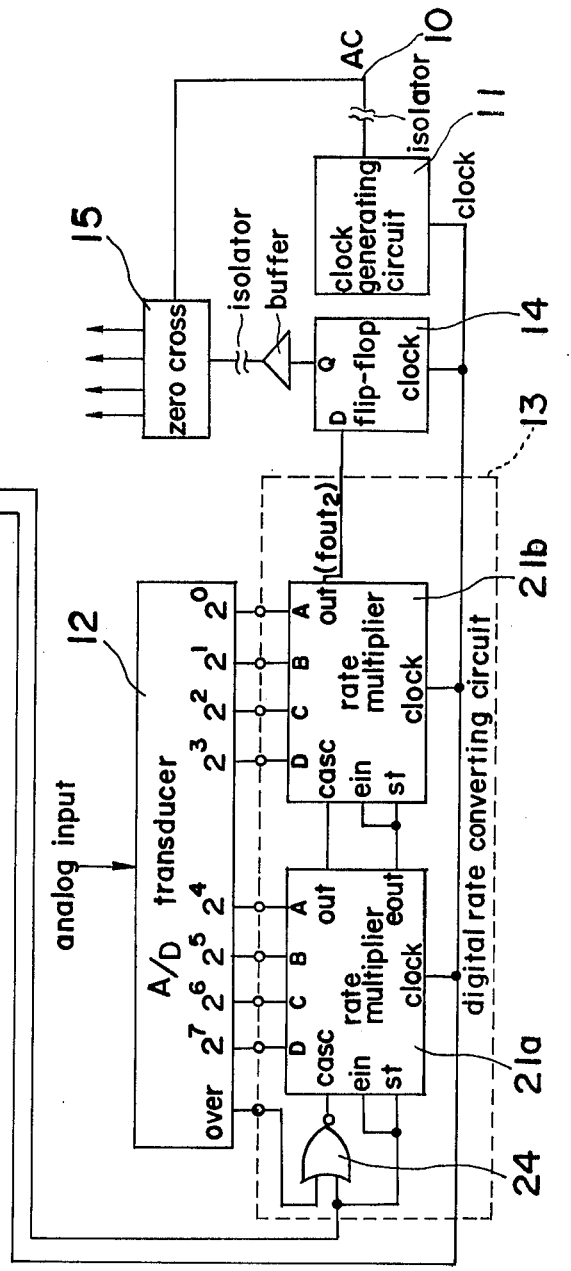
Figure 7:
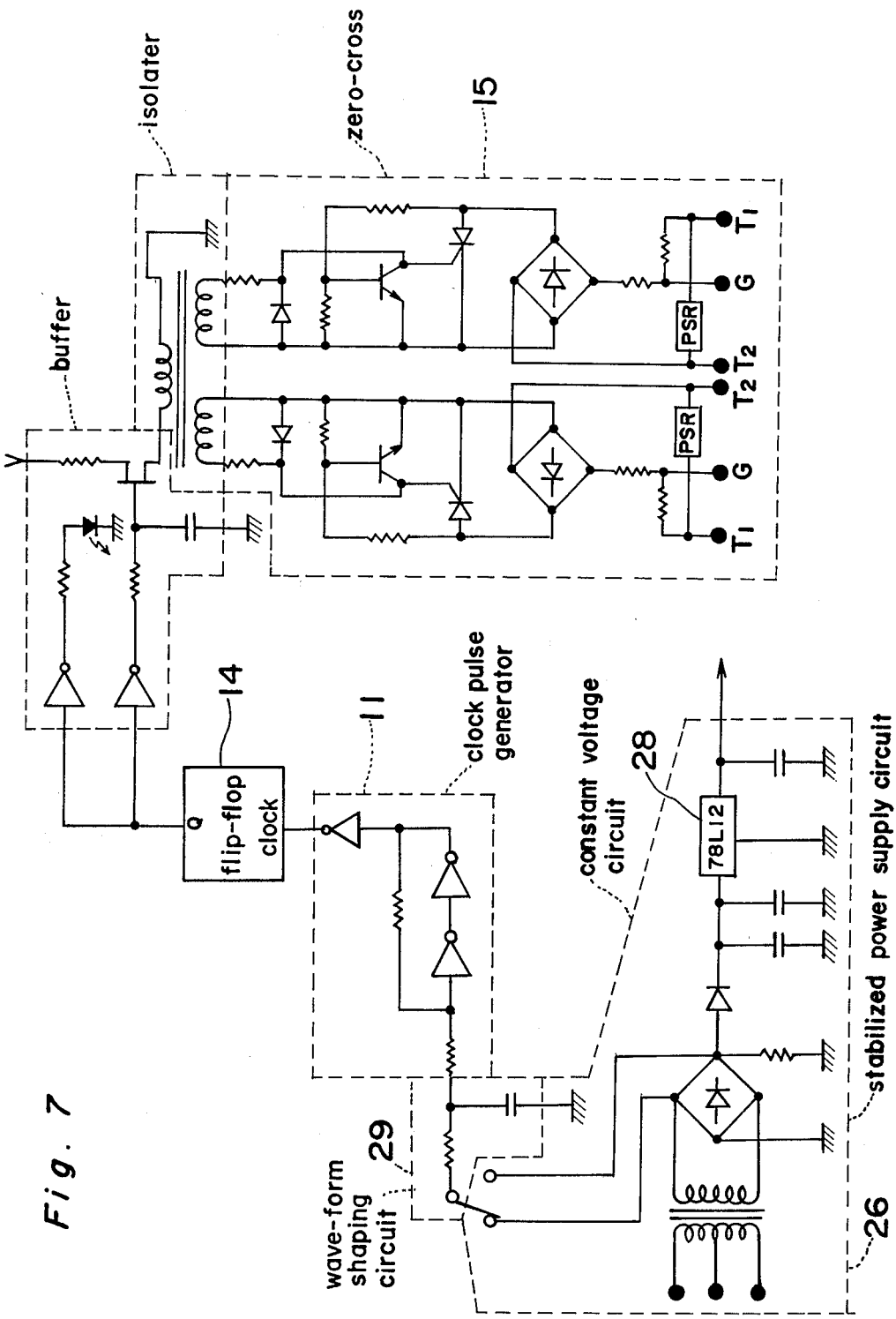
FIG. 7 is a circuit diagram showing details of the circuit construction of circuits employed in the circuit of FIG. 3.

FIG. 2 shows a block diagram of a power control digital circuit 4' comprising a power supply synchronous clock generating circuit 11 for generating a clock pulse to be synchronized with an AC power supply 10 for feeding AC power to a load 1, an A/D transducer 12 for converting analog signals of the output circuit 3 onto the digital signals, a power reducing circuit 16 for providing power reducing signals on the basis of a power reduction factor instruction code 22 to be supplied thereto, a digital rate converting circuit 13 and a serial pulse generating circuit 14 connected to a zero-cross power controlling circuit 15. The detailed connections with each components of the power control digital circuit 4' are shown in FIG. 3 providing with known city-market parts such as IC circuit TC5091 of Toshiba, Japan for A/D transducer 12, IC circuit MC14013 of Motorolla, U.S.A. for serial pulse generating circuit 14, IC circuit CD4089 of RCA, U.S.A. for digital rate converting circuit 13 and power reducing circuit 16 in association with digital switch KDS16-111 of Kell, Japan for a power reduction factor instructions code 22, and transistor circuit MC14001 of Motorolla, U.S.A. for NOR circuit 24. The A/D transducer 12 is connected in series with the digital rate converting circuit 13, serial pulse generating circuit 14, zero-cross power controlling circuit 15, and in parallel with the power reduction factor instruction code 22 and power reducing circuit 16, the power supply synchronous clock generating circuit 11 being connected in series with the AC power supply 10 and in parallel with the serial pulse generating circuit 14, and NOR circuit 24 being provided between the power reducing circuit 16 and digital rate converting circuit 13. The digital rate converting circuit 13 transmits a signal, which specifies whether or not the clock pulse should be outputted through synchronization with the AC power source 10 to convert the digital signal of the A/D transducer 12 into serial pulse. The serial pulse generating circuit 14 generates a time-sharing signal for transmitting a signal through the time division to control ON and OFF anytime the clock pulse enters from the converting circuit 13. During the input period of the energization signal to be inputted from the generating circuit 14, the zero-cross power controlling circuit 15 always detects voltages at the respective ends of the switch element for thyristor, triac or the like provided within the AC power supply 10 to which the load 1 is connected to detect the point when the value becomes zero, thereby to control the ON time and OFF time. The digital rate converting circuit 13 is an apparatus which can generate M number of clocks specified in the repetition of the N number of clock pulse counting. For example, the clock pulse is inputted from the power supply synchronous clock generating circuit 11 and the clock pulse is divided into a given number of clocks in accordance with a given signal range to control the optionally determined or preprogrammed output signal. Among the divided clocks, the particular clock is specified in accordance with a given mechanism determined optionally or preprogrammed in accordance with the output signal, and all of the specified particular clocks are arranged to be almost equally dispersed among the division clocks. The serial pulse generating circuit 14 controls ON-OFF anytime a particular clock enters from the converting circuit 13 thereby not to let the OFF continue twice when the control factor which feeds the power to the load from the power controlling circuit 4 is 50% or more and to let the ON and OFF repeat when the control factor is 50%, while, when the control factor is 50% or less, the ON is adapted not to continue twice, and, when the ON comes once, the output is adapted to be transmitted by one wave-form before the next clock is transmitted from the converting circuit 13. The zero cross power controlling circuit 15 is a power control circuit for controlling AC supply voltage to be supplied to the load under the operation of a zero-crossing detector is such a known manner that the voltage is supplied to the load at very nearly the exact moment of zero level with the input signal of the voltage greater than or less than zero, the detailed construction of the zero cross power controlling circuit 15 being shown, for instance, within FIG. 7. Accordingly, the zero cross power controlling circuit 15 changes the power to be fed to the load 1 due to the number of the waves of the AC power supply, instead of the ON and OFF time, and makes a comparison such that the input signal may become the number of the output waves anytime the output energy of the unit time of one cycle or half the cycle energization of the AC power supply 10 is outputted, thereby to determine whether or not the following one cycle or half the cycle is outputted. The power reducing circuit 16 is adapted to apply a particular limit in advance upon a clock to be generated from the digital rate converting circuit 13, turning to the clock pulse of the power supply synchronous clock generating circuit 11 in accordance with reduction factor instructions which are outputted as certain signals of the reduction factor by a preprogrammed set means. Assume that there is a power reduction factor instructions signal of 20%, then the control factor of the clock of the digital rate converting circuit 13 is reduced by a factor of 0.8 for outputting operation. The power reducing circuit 16 is provided additionally in accordance with the requirement of circuits.

A power control digital circuit 4' of such construction as described hereinabove tunes to the AC power supply 10 in operation and turns the input from the output circuit 3 into the digital signal to cause the digital rate converting circuit 13 to synchronize with the clock pulse of the AC power supply 10 thereby to convert it into the clock, and, thereafter, a time division signal is generated by the serial pulse generating circuit 14. The zero-cross power controlling circuit 15 is driven with the time division signal to feed the power of the AC power supply 10 to the load 1 each one cycle or half the cycle of the AC power supply 10. The control factor of the clock conversion of the digital rate converting circuit 13 is adjusted by the power reducing circuit 16 to control the power to be further fed to the load 1.

Figure 4:
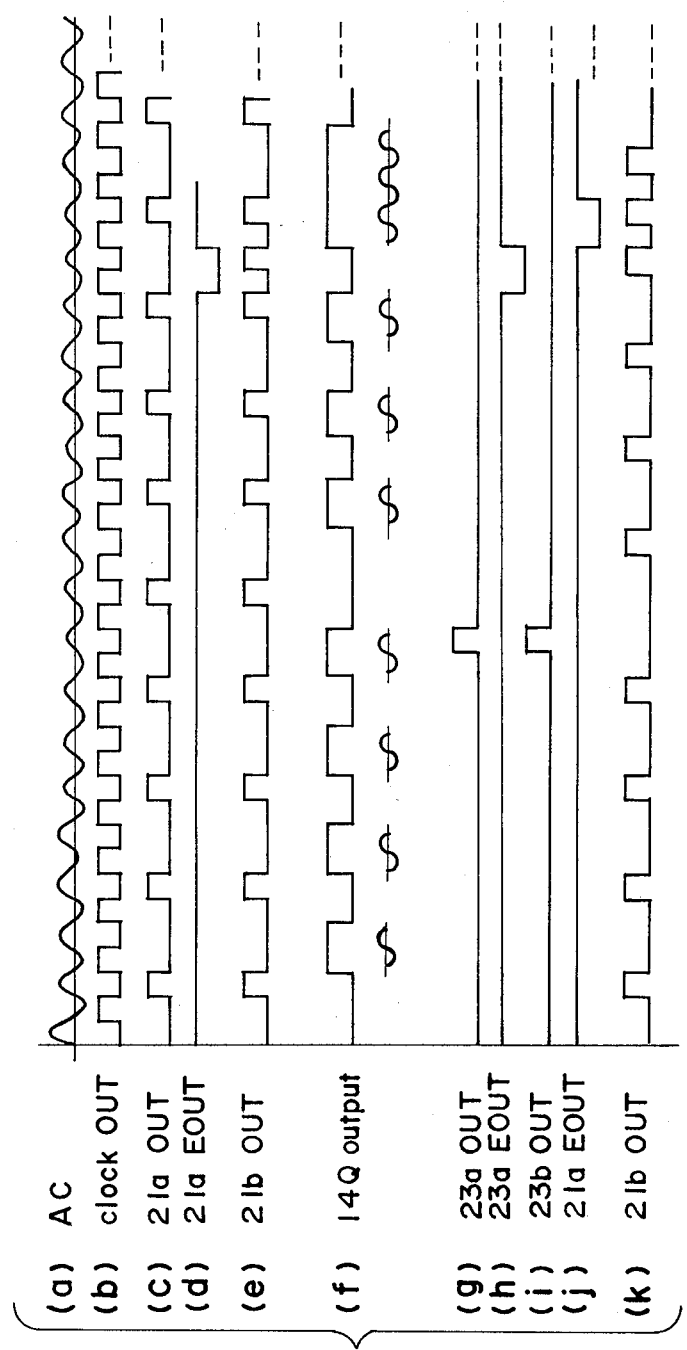
FIG. 4(a) through (k) are diagrams showing the output wave-forms of each portion of the circuit of FIG. 3.

One example of the concrete circuit construction of the power control digital circuit 4' shown in FIG. 2 is shown in FIG. 3 and the output signals of the respective circuits in FIG. 3 are shown in FIG. 4.

The output of the AC wave-form of the AC power supply 10, as shown in FIG. 4(a), enters the wave-form shaping circuit of a power supply synchronous clock generating circuit 11 through an isolator thereby to generate the clock pulse of a given width and a given period, as shown in FIG. 4(b). A digital rate converting circuit 13 is composed of four-bit binary rate multipliers 21a, 21b cascade-connected to upper and lower two stages. Each of the conventional rate multipliers are configured to divide the frequency of the clock signal in accordance with the four bit binary inputs of the respective terminals ABCD. For example when the bianry input is 13 (1101), there will be 13 output pulses for every 16 clock pulses. The two multipliers are connected together in the "add" mode. Thus, for example, should rate multiplier 21a have an input of 11 and rate multiplier have an input of 13, there will be produced at the output of circuit 21b 189 output pulses for every 256 clock generator circuit clock pulses (11/16+13/256). The digital-signal output of the A/D transducer 12 is inputted to the lower-stage rate multiplier 21b of four bits representing the upper column of the upper stage rate multiplier 21a and to the upper-stage rate multiplier 21a of four bits representing the lower column of the upper stage rate multiplier 21a. During the presence of the output of the upper-stage rate multiplier 21a, for instance, the output as shown in FIG. 4(c) to be generated when 1,000 has been inputted to the upper-stage rate multiplier 21a in binary, the output of the lower-stage four-bit rate multiplier 21b is added to the output of the upper-stage rate multiplier 21a at the timing of the lower-stage rate multiplier output, as shown in FIG. 4(d), and the input signal from the A/D transducer 12 is selected from 256 clock pulses, whereby a series of clocks, as shown with the output of 10001000 through binary in FIG. 4(e), enter the serial pulse generating circuit 14. The serial pulse generating circuit 14 is composed of a data flip-flop circuit, wherein the entire clock of one period to be inputted from the digital rate converting circuit 13 is memorized through the rise of the clock and, then, is synchronized to the AC power supply 10, to pass through a buffer as the power of the AC wave-form of one cycle or half the cycle, as shown in FIG. 4(f), and later is inputted to the zero-cross power controlling circuit 15 through the isolator. As described hereinabove, it is to be noted that in the four bit binary rate multiplier 21a, 21b of upper and lower two stages, 256 pulses are adapted to become one unit time with the 256 pulses as one cycle energization of 5.12 seconds at 50 Hz. The power reducing circuit 16 is composed of four-bit binary rate multipliers 23a, 23b cascade-connected to the upper and lower two stages connected to a power reduction factor instructions code 22. The output of the lower stage of rate multiplier 23b, which receives the input of the upper stage of rate multiplier 23a is inputted to the cascade (Casc) of the upper stage of rate multiplier 21a of the digital rate converting circuit 13 through a NOR circuit 24 together with the over of the A/D transducer 12 and is inputted to each terminal of the enable in (E in) and strobe (ST) of the upper stage of rate multiplier 21a to become the offering input of the digital rate converting circuit 13. FIG. 4(g) through (k) show the output waveform in each portion of FIG. 3, for example, FIG. 4(g) shows the output of 0001, FIG. 4(i) shows the output of 00010000, FIG. 4(k) is the output of the digital rate converting circuit 13 to be obtained under the instructions of the reduction factor of 00010000 from 10001000.

Figure 5:
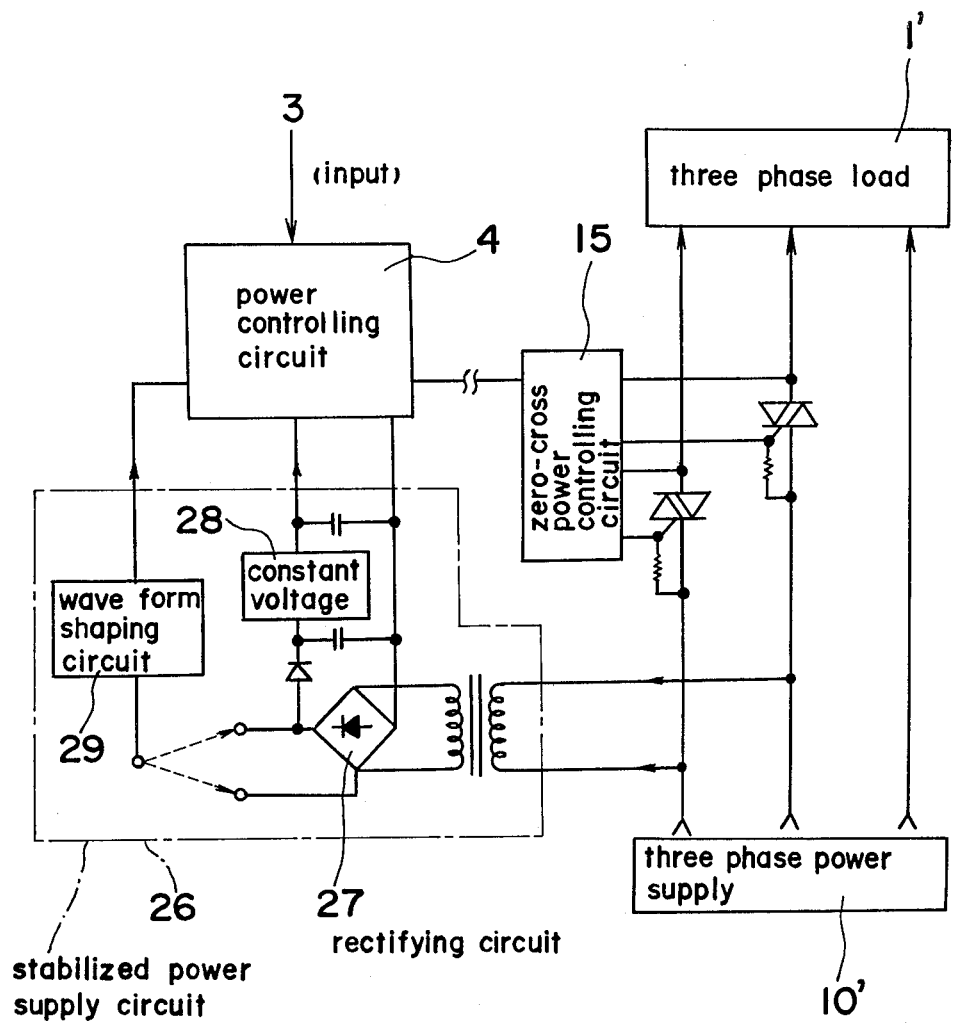
FIG. 5 is a circuit diagram in a case where the circuit of FIG. 1 has been used for a three-phase power supply.
Figure 6:
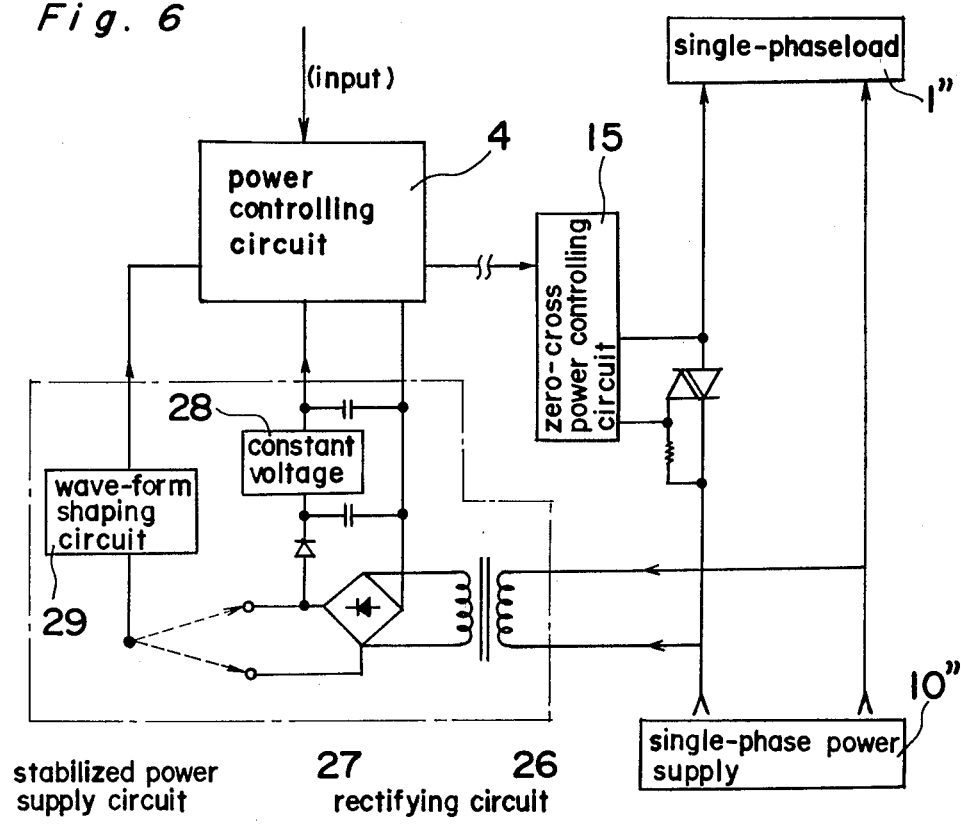
FIG. 6 is a circuit diagram in a case where the circuit of FIG. 1 has been used for a single-phase power supply.

As shown in FIG. 5, the AC power supply 10 may use a three-phase power supply 10' or a single-phase power supply 10" as shown in FIG. 6. The three-phase power supply of FIG. 5 is connected to the three-phase load 1', and the DC voltage of the stabilized constant voltage and the wave-form-shaped clock pulse are outputted to the power controlling circuit 4 through a stabilized power supply circuit 26, which is composed of a bridge full-wave rectifying circuit 27 and a constant voltage circuit 28 and a wave-form shaping circuit 29. The output of the power controlling circuit 4 is inputted to the zero-cross power controlling circuit 15 through the isolator, and the three-phase power supply 10' is controlled in power with respect to the three-phase load 1' at the output of the zero-cross power controlling circuit 15. The same operation as that of the three-phase power supply of FIG. 5 can be obtained even in a case where the single-phase power supply is used for the single-phase load as shown in FIG. 6.

Figure 8:
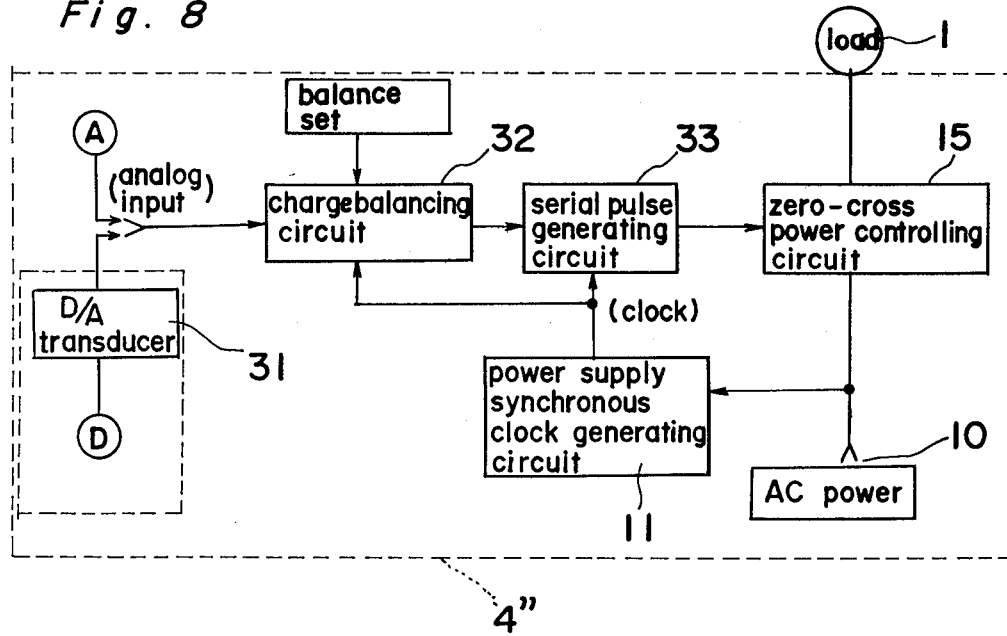
FIG. 8 is a block diagram of a power control analog circuit as one embodiment of the power controlling circuit of FIG. 1.
Figure 9:
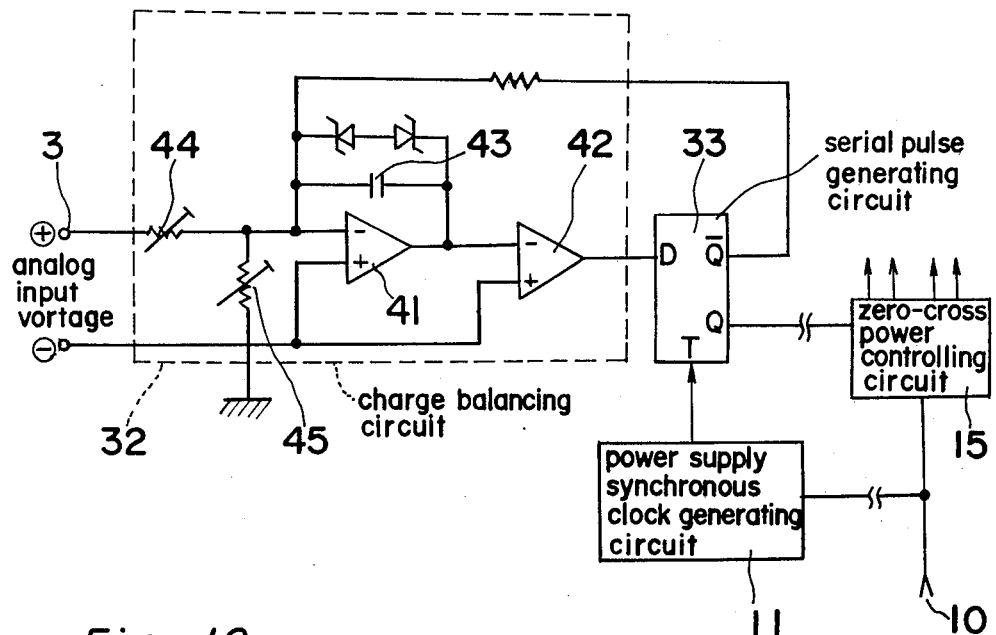
FIG. 9 is a circuit diagram showing details of the circuit construction of the circuit of FIG. 8.
Figure 10:
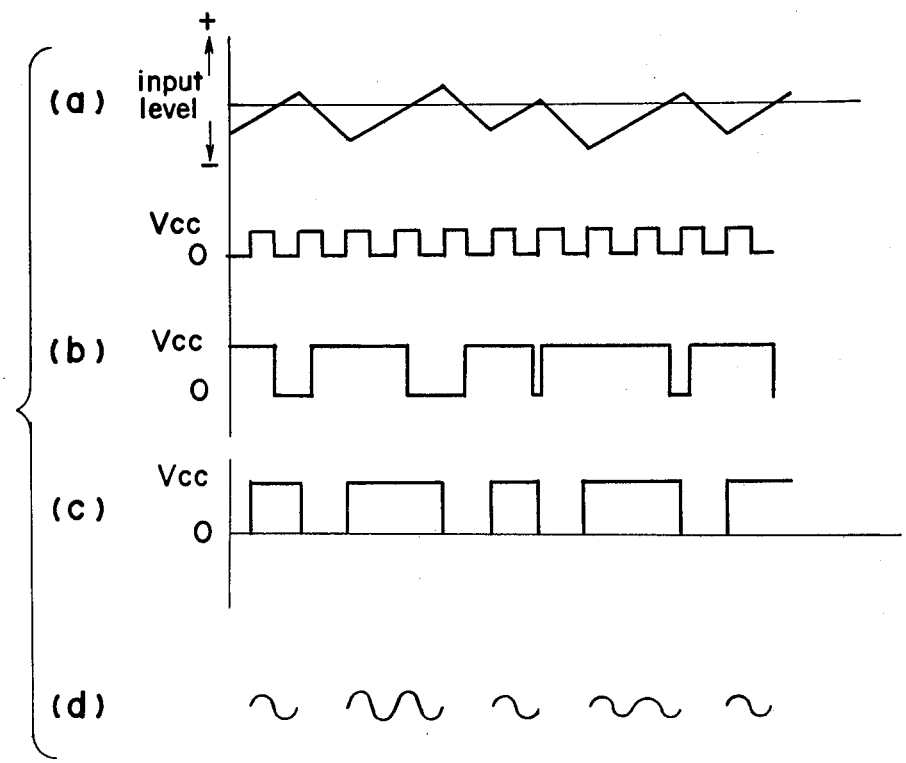
FIG. 10(a) through (d) are diagrams each showing the output wave-form of each portion of a circuit of FIG. 9.
Figure 11:
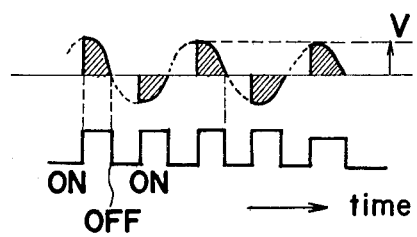
FIGS. 11(a) and (b) are diagrams each showing the output control wave-form of an apparatus of FIG. 1 and an apparatus using the conventional phase controlling system.
Figure 11:
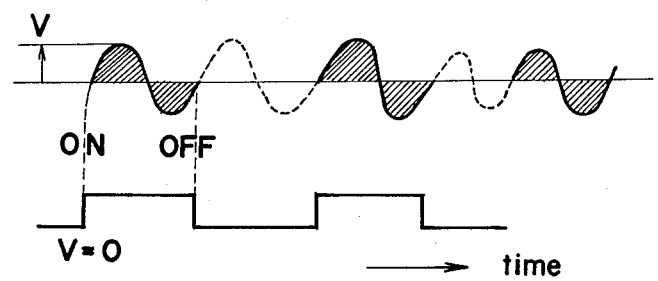
Figure 12:
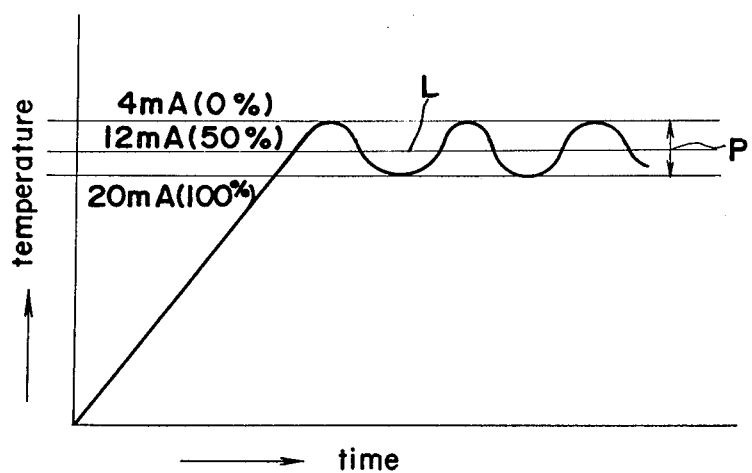
FIG. 12 is a time-temperature curve chart showing the control condition in a case where the temperature has been controlled by the use of the apparatus of FIG. 1.

When the power control digital circuit 4' of FIG. 2 as described hereinabove is incorporated in an automatic temperature regulating apparatus of FIG. 1, the output signal of the output circuit 3 for the temperature regulator is converted into a clock synchronized with the AC power supply through averaging of the power distribution in a particular unit time and the energization, non-energization are set for each one cycle of the AC power supply in accordance with the clock. Accordingly, by the employment of the power control digital circuit 4', since the uneven distribution of the power in the unit time is less and an output wave-form close to that of conventional phase control is provided, high resolution is provided and suitable temperature control is ensured for, for example, infrared-ray lamp, hot air or the like, wherein the response of the power supply is quick and the heat inertia is small. Also, when the stabilized power supply 26 is used for the power controlling circuit 4, the accuracy and stabilization are higher, while, when a double integrating type A/D transducer 12 is used, the commercial frequencies included in the input signal and the noises included in its higher harmonic component can be removed, and automatic off-set correction can be performed. In addition, when the power controlling circuit 4', which is composed of such rate multiplier and flip flop as described hereinabove is used, the construction becomes simple as compared to conventional zero-cross controlling circuits. Through the combination with the zero-cross power controlling circuit 15, which works to make a zero-cross operation independently of the power supply synchronous clock, the point at which the zero-cross circuit turns on and off is controlled by the clock to allow the controlling operation close to one cycle energization to be performed for each phase even the three-phase AC power supply applications. For example, when it is expressed in energization angle, the phase of 420° becomes one and the phase of 330° becomes two during balance load, thus resulting in 1,080° in total which means one cycle energization of three-phase power. In addition, in the conventional ratio zero-cross control, the output of the power distribution was deviated to one side and continuous in the unit time. However, when the power controlling circuit 4 of such averaged power distribution as described hereinabove is used, one energization time is short, the power controlling element can be controlled in the smaller region of the excessive heat impedance and the current limit can be performed, since two wave forms cannot be continued before the control factor as rate with which the power is fed to the load is reached by 50%. Also, the necessary digital operation is performed, respectively, upon the inputs of the power controlling circuit 4 and the power reducing circuit 16 for easier expansion of the function. The power reducing circuit 16 is such that the non-energization cycle interrupts the clock of the digital rate converting circuit 13 to change the interval of the unit time thereby to regulate the power density. However, such a regulation for density does not tend to lower the resolution. The power controlling circuit 4 can be composed of a power control analog circuit 4", for instance, which comprises a power supply synchronous clock generating circuit 11 for generating a clock pulse to be synchronized with an AC power supply 10 for feeding AC power to a load 1 through the zero-cross power controlling circuit 15, a D/A transducer 31 for converting digital signals of the output circuit 3 into analog signals, a charge balancing circuit 32 for providing charge balancing signals on the basis of regulation of a regulating circuit for the gain and zero-level, and a serial pulse generating circuit 33 for outputting to the zero-cross power controlling circuit 15, as shown in FIGS. 8 to 10. The detailed connections with each components of the power control analog circuit 4" are shown in FIG. 8 providing with known city-market parts such as IC circuit MC3410 of Motorolla, U.S.A. for D/A transducer 31, IC circuit MC14013 of Motorolla, U.S.A. for serial pulse generating circuit 33, transistor circuit LM2902 of Motorolla, U.S.A. for a differential amplifier 42 of charge balancing circuit 32 and variable resistors for gain regulating circuit 44 and zero regulating circuit 45. The D/A transducer 31 connected in series with the charge balancing circuit 32, serial pulse generating circuit 33, zero-cross power controlling circuit 15, the charge balancing circuit 32 being associated with the regulating circuit for gain and zero-level 44, 45 and the serial pulse generating circuit 33 being associated with the power supply synchronous clock generating circuit 11. In the block circuit 4" shown in FIG. 8, the zero-cross power controlling circuit 15 and the power supply synchronous clock generating circuit 11 are completely the same as compared with the power control digital circuit 4' of FIG. 2. A D/A transducer 31, a charge balancing circuit 32 and a serial pulse generating circuit 33 are respectively equivalent to the A/D transducer 12 of the power control digital circuit 4', a digital rate converting circuit 13 and a serial pulse shape generating circuit 14. The charge balancing circuit 32 synchronizes the analog amount from the D/A transducer 31 to the clock pulse from the power supply synchronous clock generating circuit 11 to compare it with the output pulse by an integrator. As shown in FIG. 9, the charge balancing circuit 32 is composed of a differential amplifier 42 connected to the two stages, upper and lower, a capacitor 43 connected in parallel to the upper stage of differential amplifier 41 to constitute an integrator. A variable resistor for regulating gain 44 and a variable resistor for regulating the zero 45 are additionally disposed in the charge balancing circuit. The output of the upper-stage differential amplifier 41 shows delta wave pulses, as shown within FIG. 10(a), due to the relation between the charging and discharging of the capacitor 43. The output of the lower stage of differential amplifier 42 becomes the short-form wave pulses, as shown within FIG. 10(b). The serial pulse generating circuit 33 converts the pulses into pulses synchronized to the AC power supply 10 in accordance with the pulses from the charge balancing circuit 32. The pulse is sent to the zero-cross power controlling circuit 15 through the isolator and simultaneously the inversion pulse, as shown in FIG. 10(c), is inputted onto the earth side of the capacitor. The signal and the analog signal are averaged by the charge balancing circuit to determine which is larger in the comparison with the control output through the comparator 42. Accordingly, the difference between the input signal and the output is detected, by the upper stage of differential amplifiers 41, 42, in the charge balancing circuit 32 and the serial pulse generating circuit anytime the power supply synchronous clock pulse enters thereby to instruct the capacitor 43 to be charged or discharged. The charging operation to the capacitor is effected with the analog signal from the D/A transducer 31. When the electric charge of the capacitor 43 is more than the reference of the particular input level, the power supply synchronous clock pulse enters to cause the capacitor 43 to be discharged thereby to transmit the output signal to the lower stage of differential amplifier 42 during the discharging operation. The reference and discharge amount of the capacitor 43 are properly regulated by the zero regulating variable resistor 45 and the gain regulating variable resistor 44 so that the input and output of the differential amplifier 41 is compared with each other, in the form of charge, by the capacitor 43. The charge is adapted to be controlled to be balanced by the charging and the discharging. The operational effect of the power control analog circuit 4″ of FIG. 8, of the above-described construction to be applied upon the zero-cross power controlling circuit 15 is completely the same as the above-described power control digital circuit 4′ of FIG. 2, as shown with the last voltage in FIG. 10(d). The wave-form in the control factor of 50% when the zero-cross control has been performed by the use of the power controlling circuit 4 of the above-described construction, and the wave-form in the control factor of 50% by the use of the conventional phase controlling system are shown, respectively, in FIGS. 11(a), (b). In the latter, noise may be caused due to the ON state occurring at the peak of the entire voltage, while in the former, noise is avoided. Also, when the temperature of the load is regulated by the use of such automatic temperature regulating apparatus as described hereinabove, the temperature is controlled around the reference value L so that the temperature may normally stay within a given control setting range P as shown in FIG. 12.

As described fully in the above-described embodiment, the automatic temperature regulating apparatus of the present invention is adapted to synchronize the output signal, to be transmitted in accordance with the condition of the load, with the AC power supply of the load for conversion into such a clock as to average the power to be fed to the load thereby to control the zero-cross power controlling circuit. Thus, since the power control to the load near the conventional phase control can be performed, the practical value is higher.

Although the present invention has been described and illustrated in detail, it is to be clearly understood that the same is by way of limitation, the spirit and scope of the present invention being limited only by the terms of the appended claims.

What is claimed is:

1. A power control apparatus for controlling application of A.C. power to a load wherein an output of an A.C. power source is connected to the load by at least one switch element, said control apparatus comprising:
    feedback means for generating a feedback signal indicative of an amount of power actually applied to the load;
    reference means for providing a reference signal indicative of a nominal amount of power to be applied to the load;
    power reducing factor means for providing a power factor reducing signal indicative of a factor by which said nominal amount of power is to be reduced;
    rate converting means responsive to said feedback, reference and power factor reduction signals for providing a control signal which corresponds to the amount of power to be applied to said load;
    zero-cross power controlling means for switching said at least one switch element in response to said control signal at zero voltage cross-over points of said A.C. power source.

2. The power control apparatus of claim 1 wherein said rate converting means includes a first variable frequency divider circuit responsive to said power factor reducing signal and a second variable frequency divider circuit responsive to said feedback and reference signals.

3. The power control apparatus of claim 2 wherein said rate converting means includes clock generating means for generating a clock signal synchronous with said A.C. power source, with said clock signal being coupled to said first and second variable frequency divider circuits.

4. The power control apparatus of claim 3 wherein said first and second variable frequency divider circuits are connected in series.

5. The power control apparatus of claim 8 wherein said rate converting means includes serial pulse generating means for synchronizing said control signal with said A.C. power source.

6. The power control apparatus of claim 5 wherein said rate converting means includes analog circuitry means for providing an analog error signal indicative of the difference between said feedback signal and said reference signal, analog-to-digital converting means for converting said analog error signal to a digital error signal which controls said second variable frequency divider circuit.

7. A power control apparatus for controlling application of A.C. power to a load wherein an output of an A.C. power source is connected to the load by at least one switch element, said control apparatus comprising:
    feedback means for generating a feedback signal indicative of an amount of power actually applied to the load;
    reference means for providing a reference signal indicative of a nominal amount of power to be applied to the load;
    power reducing factor means for providing a power factor reducing signal indicative of a factor by which said nominal amount of power is to be reduced;
    zero-cross power controlling means for switching said at least one switch element in response to a control signal at zero voltage cross-over points of said A.C. power source; and
    rate converting means for producing said control signal, said rate converting means including clock generating means for generating a clock signal, first variable frequency divider circuit means for reducing the frequency of said clock signal in accordance with said power factor reducing signal and second variable frequency divider circuit means connected in series with said first variable frequency divider circuit means for reducing the frequency of said clock signal in accordance with said feedback and said reference signals.

* * * * *